(12) United States Patent
Ramachandra Panicker

(10) Patent No.: US 9,407,697 B2
(45) Date of Patent: Aug. 2, 2016

(54) SYSTEM AND METHOD FOR AUTOMATING IDENTIFICATION AND DOWNLOAD OF WEB ASSETS OR WEB ARTIFACTS

(71) Applicant: Wipro Limited, Bangalore (IN)

(72) Inventor: Vinod Ramachandra Panicker, Kochi (IN)

(73) Assignee: Wipro Limited, Bangalore (IN)

(*) Notice: Subject to any disclaimer, the term of this patent is extended or adjusted under 35 U.S.C. 154(b) by 139 days.

(21) Appl. No.: 14/448,722

(22) Filed: Jul. 31, 2014

(65) Prior Publication Data

US 2015/0365477 A1    Dec. 17, 2015

(30) Foreign Application Priority Data

Jun. 11, 2014  (IN) .......................... 2850/CHE/2014

(51) Int. Cl.
*G06F 15/16* (2006.01)
*H04L 29/08* (2006.01)
*H04L 12/24* (2006.01)

(52) U.S. Cl.
CPC ............ *H04L 67/1095* (2013.01); *H04L 67/02* (2013.01); *H04L 41/0293* (2013.01)

(58) Field of Classification Search
CPC .. H04L 41/0293; H04L 67/02; H04L 67/1095
See application file for complete search history.

(56) References Cited

U.S. PATENT DOCUMENTS

| 2002/0087447 | A1* | 7/2002 | McDonald | G06Q 40/06 705/36 R |
| 2003/0144868 | A1* | 7/2003 | MacIntyre | G06F 17/30536 705/7.38 |
| 2003/0225763 | A1* | 12/2003 | Guilak | G06F 17/30707 |
| 2005/0034063 | A1* | 2/2005 | Baker | G06F 17/30884 715/241 |
| 2008/0281944 | A1* | 11/2008 | Vorne | H04L 29/08846 709/218 |
| 2009/0210369 | A1* | 8/2009 | Shao | G06F 17/30864 706/21 |
| 2015/0244786 | A1* | 8/2015 | Yang | H04L 65/4084 709/219 |

\* cited by examiner

*Primary Examiner* — Mohamed Wasel
(74) *Attorney, Agent, or Firm* — LeClairRyan, a Professional Corporation

(57) ABSTRACT

Methods, non-transitory computer-readable media, and apparatuses that automate identification and download of one or more web assets residing in a cloud based infrastructure are disclosed. The method may include a training phase and an actual run time phase. In the training phase, the apparatus is trained to identify and download the one or more web assets by generating URLs on its own. The one or more web assets may be an image, document, file containing source code. In the actual run time phase, when the one or more web assets has migrated from one machine to another machine in the cloud, the one or more web assets are again referenced. The apparatus is intelligent enough to detect this re referencing and retrieving the one or web assets.

16 Claims, 4 Drawing Sheets

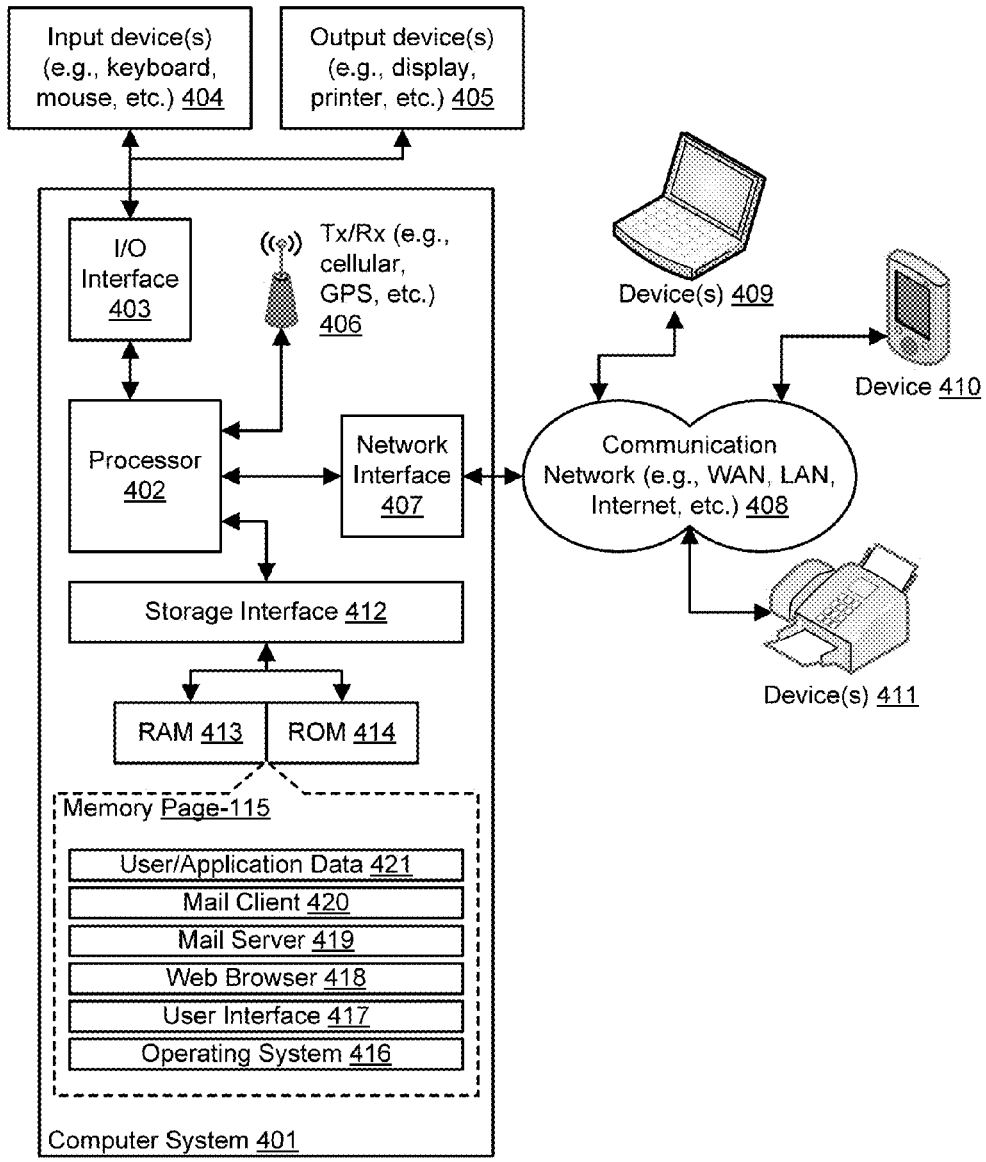
FIG. 4: Example Computer System ably distributed 3rd party infrastructure. In the cloud,
SYSTEM AND METHOD FOR AUTOMATING IDENTIFICATION AND DOWNLOAD OF WEB ASSETS OR WEB ARTIFACTS This application claims the benefit of Indian Patent Application No. 2850/CHE/2014 filed Jun. 11, 2014, which is hereby incorporated by reference in its entirety.

FIELD

This technology generally relates to hosting of web assets in cloud based applications and, more particularly, to automatic identification and download of the web assets in cloud based systems.

BACKGROUND

With influence of cloud infrastructure and cloud based applications built on internet scale architecture, today web assets like image, document, file containing source code can be dynamically hosted on different machines and even geographically distributed $3^{rd}$ party infrastructure. In the cloud, virtual machine can be created dynamically and the referenced web assets keep migrating from one machine to another machine. In view of the migration of the web assets from one machine to another machine, identification, upgrading, and downloading of the web assets poses a serious challenge as the web links to the web assets are re referenced.

Therefore, in view of the above drawbacks, there is a need to have a system and a method for automatic identification and download of the web assets from the cloud based systems.

SUMMARY

A method for automating identification and download of one or more web assets residing in a cloud based infrastructure includes seeding one or more first predetermined URLs to a cyber scraper to download corresponding one or more web pages. The one or more first URLs from the downloaded one or more web pages are validated based at least in part on one or more classification rules. The one or more classification rules satisfy one or more criteria associated with retrieving one or more web assets. Each of the validated one or more first URLs are broken into one or more first predictor values derived from one or more first predictor variables. One or more navigation rules are generated by performing logistic regression on the predictor values to construct a web asset pipeline comprising one or more second URLs. The cyber scraper is trained to identify and download the one or more web assets or an intermediate web artifact page for each of the one or more second URLs. The one or more web assets or the intermediate web artifact page are identified and downloaded during run time for each of the one or more second URLs generated using the one more navigation rules.

An apparatus that automates identification and download of one or more web assets residing in a cloud based infrastructure includes one or more hardware processors and a computer-readable medium storing instructions that, when executed by the one or more hardware processors, cause the one or more hardware processors to perform operations including seeding one or more first predetermined URLs to a cyber scraper to download corresponding one or more web pages. The one or more first URLs from the downloaded one or more web pages are validated based at least in part on one or more classification rules. The one or more classification rules satisfy one or more criteria associated with retrieving one or more web assets. Each of the validated one or more first URLs are broken into one or more first predictor values derived from one or more first predictor variables. One or more navigation rules are generated by performing logistic regression on the predictor values to construct a web asset pipeline comprising one or more second URLs. The cyber scraper is trained to identify and download the one or more web assets or an intermediate web artifact page for each of the one or more second URLs. The one or more web assets or the intermediate web artifact page are identified and downloaded during run time for each of the one or more second URLs generated using the one more navigation rules.

A non-transitory computer-readable medium having stored thereon instructions for automating identification and download of one or more web assets residing in a cloud based infrastructure comprising executable code which when executed by a processor, causes the processor to perform steps including seeding one or more first predetermined URLs to a cyber scraper to download corresponding one or more web pages. The one or more first URLs from the downloaded one or more web pages are validated based at least in part on one or more classification rules. The one or more classification rules satisfy one or more criteria associated with retrieving one or more web assets. Each of the validated one or more first URLs are broken into one or more first predictor values derived from one or more first predictor variables. One or more navigation rules are generated by performing logistic regression on the predictor values to construct a web asset pipeline comprising one or more second URLs. The cyber scraper is trained to identify and download the one or more web assets or an intermediate web artifact page for each of the one or more second URLs. The one or more web assets or the intermediate web artifact page are identified and downloaded during run time for each of the one or more second URLs generated using the one more navigation rules.

BRIEF DESCRIPTION OF THE DRAWINGS

The accompanying drawings, which constitute a part of this specification, illustrate several embodiments and, together with the description, serve to explain the disclosed principles. In the drawings:

FIG. 4 is a block diagram of an exemplary computer system for implementing embodiments consistent with the present disclosure.

DETAILED DESCRIPTION

As used herein, reference to an element by the indefinite article "a" or "an" does not exclude the possibility that more than one of the element is present, unless the contextually requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

Figure 1:
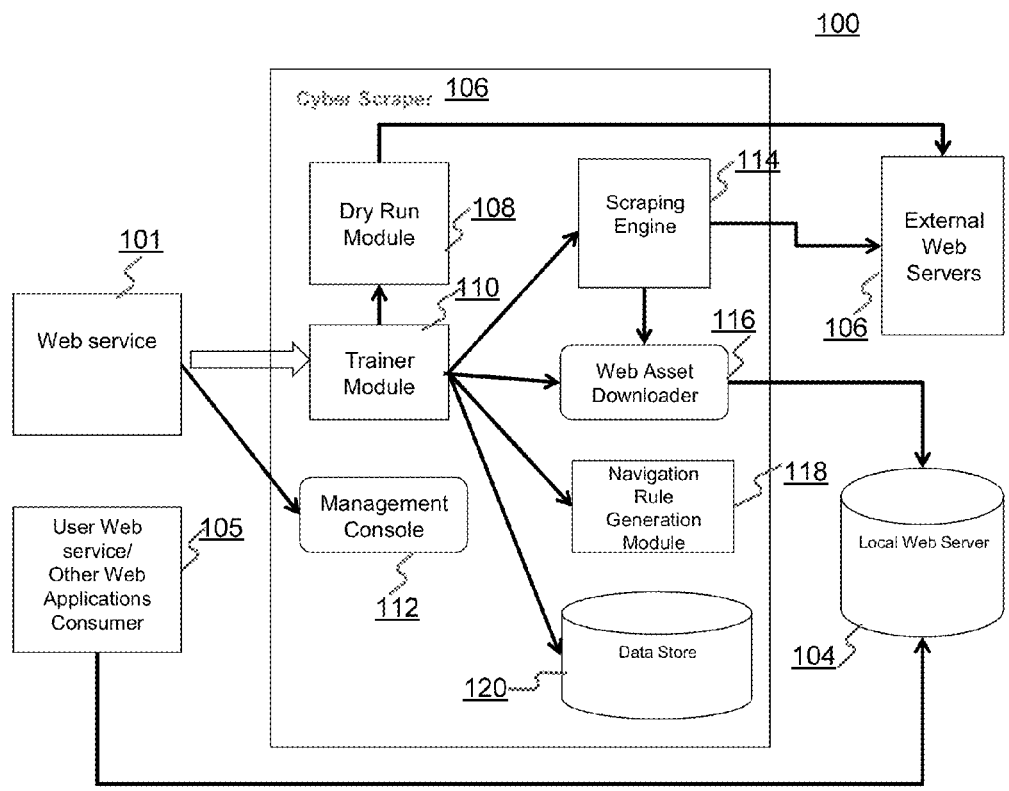
FIG. 1 is a block diagram of a high-level architecture of an exemplary system for automatic identification and download of the web assets in cloud based systems in accordance with some embodiments of the present disclosure.

FIG. 1 is a block diagram of a high-level architecture of an exemplary system 100 for automatic identification and download of the web assets in the cloud based architecture in accordance with the present disclosure. The system 100 may comprise a web service 101, a local web server 102, one or more external web servers 104, user web service/other web applications consumer 105, and a cyber scraper 106. The cyber scraper 106 may include a dry run module 108, a trainer module 110, a management console 112, a scraping engine 114, a web asset downloader module 116, a navigation rule generator module 118, and a data store 120. The systems shown in FIG. 1 may be implemented using one or more hardware processors (not shown), and a computer-readable medium storing instructions (not shown) configuring the one or more hardware processors; the one or more hardware processors and the computer-readable medium may also form part of the system 100. Different components of the cyber scraper 106 may be described as follows:

Dry run module 108: The dry run module 108 may receive a set of predetermined index URLs from a configuration file having the predetermined URLs, URLs path segment patterns as well as web asset patterns. The index URLs may be the URLs that reference to a home web page. The one or more web pages corresponding to the predetermined URLs may be downloaded. The downloaded one or more web pages may comprise one or more web links (URLs) and associated linked web pages. Each of the one or more web links may comprise path segments. These path segments may constitute predictor variables and predictor values may be derived from the predictor values. The one or more web links may or may not refer to a web asset or a web artifact page. So there may be a need for the process of validating the one or more web links in order to ensure that the web links refer to the web asset page or web artifact page. Web artifact page is an intermediate page leading to the web asset.

Next stage may be the process of validating the one or more web links based on one or more classification rules. The one or more classification rules satisfy the one or more criteria set by a user. The one or more criteria may comprise one or more URLs web patterns and one or more web asset patterns. The one or more web patterns comprise naming construction, numeric construction, alphabetic construction, depth of url, host name, ids, and string construction of the one or more web links. The one or more web asset patterns may comprise type of the asset, extension of the web asset (extension .jpeg in case of web image, xls in case of excel file), size of the web asset (size of the image).

The configuration file may be a groovy source file that may have two sections:

The training set section, where some sample URLs of the artifacts, index pages and asset pages may be provided. The more the number of URLs provided in the training set the better. This may help in more accurate generation of the navigation rules in the cyber scraper 106.

The second section contains the generated code with the navigation rules for each index URLs page, web asset page, and web artifact page.

A group of URL path segments make up a URL. A URL path segment may map to a standard set of patterns that are updated in the data store 120 of the cyber scraper 106. The dry run may parse the web page and populates the data store 120 with all the URL's path segments found as features into the data store 120. A feature is a detail about the URL (like a path segment information, format, length, naming convention, value) that is used as a classification parameter by the predictor function in the logistic regression.

Below is a sample cyber scraper configuration file.

```
/////////////// Beginning of cyberscaper config file cscrap.groovy
///////////////////////////
// Initial user input for the training set specified by user.
//Section 1 initial list of training urls that have been manually identified .These
urls are used to train the cyber scraper and generate the navigation rules.
trainingset
{
    indexurls
    {
            http://somehost.com/pathsegment1/pathseqment2/someindexurlpage1.html,
            http://somehost.com/pathsegment1/pathseqment2/someindexurlpage2.html,
            .....
            .....
    }
    artifactpageurls
    {
            http://somehost.com/pathsegment1/pathseqment2/someartifactpagename1.html,
            http://somehost.com/pathsegment1/pathseqment2/someartifactpagename2.html,
        http://somehost.com/pathsegment1/pathseqment2/someartifactpagename3.html,
            .....
            .....
    }
    assetpageurls
```

```
        {
                http://somehost.com/pathsegment1/pathseqment2/someassetname1,
                http://somehost.com/pathsegment1/pathseqment2/someassetname2,
                http://somehost.com/pathsegment1/pathseqment2/someassetname3,
        ...
                http://somehost.com/pathsegment1/pathseqment2/someassetname(n-2),
                http://somehost.com/pathsegment1/pathseqment2/someassetname(n-1),
                http://somehost.com/pathsegment1/pathseqment2/someassetname(n),
        }
}
//***// Section 2 of the configuration file has Generated code. This section can be
manually modified to improve the accuracy of the scraping processes.
//Navigation Rule for Index URL
indexurl
{
//durl is the download url pattern to get the indexurl
durl=http://somehost.com/${ pathsegment1}/${ pathsegment2}/pagename.html
//namespace variable used to determine the context for generation of url patterns.
namespace="indexurl"
pathsegment
{
        pathsegment1=" somepathseqment1"
    pathsegment2=" somepathsegment2"
}
artifactpage{
     artifact1,
   artifact2
}
//Navigation Rule for Asset Page
asset1=assetpage{
//durl is the download url to get the assetpages, durl pattern is also an
classification rule for asset1
durl=http://somehost.com/somepathseqment1/somepathsegment/$assetname.html
namespace=" asset1"
pathsegment
{
  pathsegment1=""
  pathsegment2=""
}
// assetname is also pathsegment0
assetname{
     generatorfunction="someGeneratorFunctionName"
     rangetype="numeric" //format parameters
     padding="2" //format parameters
     rangeparam="1-10" //limit parameters
}
}//end of asset1
//Navigation Rule for Artifact Page
artifact1=artifactpage
{
//durl pattern is also an classification rule for artifact1
durl =http://someartifact patterns
namespace=" artifact1"
    asset1=assetpage
    {
                   "http://someasseturlpattern"
            "http//someasseturlpattern"
    }
// artifactName is also pathsegment0
artifactName{
  value=generatingfunction
    generatingfunction
    {
    name="someGeneratorFunctionName"
    params{
            rangetype="numeric" //format parameters
            padding="2" /format parameters
            rangeparam="1-10" //limit parameters
            }
    }
  }
}
///////////////// End of Configuration File /////////////////////////////
```

Trainer module 110: The trainer module 110 interacts with the navigational rule generator module 118, the data store 120 and the dry run module 108 during the training phase and is responsible for the triggering logistic regression to generate new navigation rules for the scraping engine 114. The trainer module 110 is also used to introduce predictor variables and one or more asset patterns. This is also used to extend the type of web assets that can be found out and also the type of navigational rules that can be generated.

Navigation Rule Generation Module 118: This navigation rule generator module 118 does a logistic regression on the data sets generated from the dry run. The result of the regression combined with the predictor variables are used to generate the next set of navigation rules. Predictor variables are the variables associated to various features of the asset or artifact pages. These are optimized during the logistic regression after a classification process The Classification process is a process where only the valid URL links in a downloaded page that satisfy the classification rules are picked up further for the logistic regression. Classification rules are rules in the configuration file that are used to determine if the URL pattern matches any of the valid artifact/assets already declared in the cyber scraper configuration file.

Scraping Engine 114: Uses the navigation rules and configuration details to scrape the artifact pages as well the web assets. It also helps in the generation of the navigation rules and passing it to the asset downloader module 116.

Data Store 120 (A Store of URLs and Predictor variables) This is the data store 120 which is used internally in the system to store URL, path segments and predictor variables derived as features from the URLs that are used to generate next set of navigation rules. For every successful run the data store 120 gets updated with additional URL path segment values, i.e., predictor values.

Web Asset Downloader module 116: is responsible for downloading web asset and web pages. The web asset downloader module 116 is invoked by other modules to download web assets. The result of the download is saved into the data store 120 along with the URL Details and timestamp.

The web Asset Downloader 116 can be called during the dry run, scraping process done by the scraping engine 114 or during the re-run of a download script from the management console 112.

Local web server 102: The download assets are hosted on the local web server 102. The web asset downloader can do this automatically using a download script that gets generated after scraping.

Invoker Web Service 101: This is the web service that is used to invoke the scraping job.

External Web Servers 104: are the on which the scraping is done. They are controlled by the index URL's used to invoke the scraping process.

Management Console 112: This is the interface to monitor and see the logs of the scraping job in progress and the current status of the system 100. This is also used to change the default parameters of the system 100. The management console 112 can be used to browse the saved download scripts. The saved scripts can re-run by the web asset downloader as needed.

Figure 2:
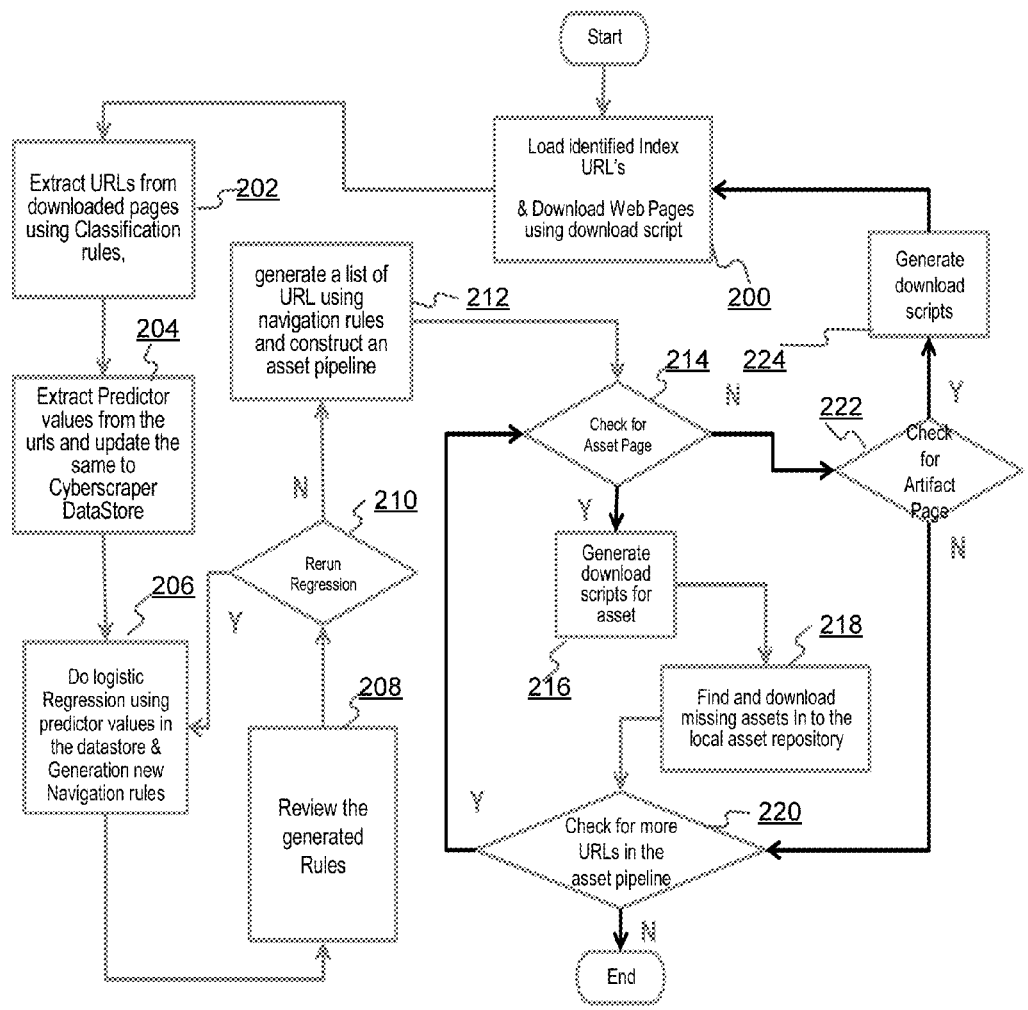
FIG. 2 is a flowchart of an exemplary method for automatic identification and download of the web assets in the cloud based systems during training phase in accordance with certain embodiments of the present disclosure.

FIG. 2 is a flowchart of an exemplary method for automatic identification and download of the web assets in the cloud based systems during training phase in accordance with certain embodiments of the present disclosure that may be executed by the system 100 as described in further detail below. It is noted however, the functions and/or steps of FIG. 2 as implemented by the system 100 may be provided by different architectures and/or implementations without departing from the scope of the present disclosure.

At step 200, the dry run module 108 loads/seeds predetermined/identified index URL into the cyber scraper 106. Index URLs are the one that pertain to the home web page. The trainer module 110 triggers the dry run. After seeding/loading the predetermined URLs to the cyber scraper 106, corresponding one or more web pages along with associated web links are downloaded using one or more download scripts. The types of web assets that must be downloaded are identified based on the configuration file At step 202, all URLs and associated web links from the downloaded one or more web pages are extracted using classification rules. The one or more classification rules satisfy one or more criteria decided by a user. The one or more criteria are associated with retrieving one or more web assets. The one or more criteria decided by the user may comprise but not limited to one or more URLs web patterns. A sample web pattern is as follows:

---

HTTP://HOSTNAME:PORT/{PATHSEGMENT_N}/
{PATHSEGMENT_N-1}/..../PATHSEGMENT_1
/PATHSEGMENT_0?PARAM1=VALUE1%PARAM2=
VALUE2..%PARAM_N=VALUE_N
PATHSEGMENT_N, PATHSEGMENT_N-1, and
PATHSEGMENT_1 form the URL. Further,
PARAM1=VALUE1%PARAM2=VALUE2..%PARAM_N=
VALUE_N represent the predictor variables and the values
for the predictor variables, respectively.

---

At step 204, the one or more predictor values corresponding to the one or more predictor variables are extracted from the extracted URLs. These predictor values are also called as features. These features then populate the data store 120.

At step 206, logistic regression is performed on the predictor values/features in order to generate one or more navigation rules using a predictor function. The predictor function is a polynomial function made up of predictor values/features A predictor function is a polynomial function made up of the features already stored in the data store 120 with default coefficients (the features included are path segments in the URL, previous visits and result of any prior web asset download, number of paths segments, type of web asset, host web server details, other web servers referred).

Predictor function can be represented as below:
$f(i)=b.X$ for a data point represent by i. (Data point $d(i)$ identified by key i is a unique combination of hostnames, path segments, parameter and asset types all of which are available in the data store and can be combined to generate an unique URI.)

Where $b.X$ is the dot product of two vectors b of coefficients and X of feature/predictor parameters/predictor values that are considered.

The predictor function is used in a sigmoid function $G(f(i))$ given by $G(f(i))=1/(1+e^{-f(i)})$. The logistic regression uses sigmoid function to do classification of the URL's patterns available in the data store 120 and navigation rules which have the maximum probability of leading the scraper (in Scraping Engine Module) to an Artifact Page or an Asset Page are identified or generated. An Artifact Page is a page which would be downloaded as an intermediate Web Page from which further Asset Page or Artifact Pages can be found during a scraping job. The maximum probability may be determined based on the result of the sigmoid function during regression. If the sigmoid function returns value as 1 the feature of the data point are used to generate the new navigation rule. If the sigmoid function returns 0, the data point is ignored.

At step 208, the generated rules may be reviewed manually. New predictor variables are identified if required. The predictor coefficients corresponding to the new predictor variables are validated. The navigation rules may be manually updated.

At step 210, decide whether the regression needs to be rerun in view of the identification of new predictor variables. If answer is Yes, go to step 206. If NO, go to step 212 where a list of URLs is generated using the navigation rules and an asset pipeline of the URLs is constructed. The asset pipeline is a collection of URLs that have to be parsed by the scraping engine 114.

At step 214, decide whether a URL corresponds to the asset page. If answer is yes, go to step 216 where download scripts may be generated for downloading the asset. The scraping engine identifies web asset pages and web artifact pages.

For each of the URLs in the Asset pipeline various checks are performed. In this step the method determine if each of the URL's in the Asset pipeline is a valid web Asset based on the URL pattern available in the data store 120. If it is a valid asset, it is flagged for download. The successful identification of asset is registered and saved as a success result into the data store 120. The combination of the asset links and web response for the url is used to flag a successful asset hit.

If the URL is not a valid asset and is a potential artifact page then the artifact page is flagged for download. Download scripts for intermediate pages are generated by the scraping engine 114 using the generated URL's. The scraping engine 114 reads the valid url patterns from the data store 120 and transforms them to actual download URLs using the path segment generation functions. The actual download URLs are saved as a series of download commands in a download script. The download script that comprises of a series of download commands will be executed by the asset web downloader 116. The generated scripts are passed to the asset web downloader 116 and the intermediate pages are downloaded. The trainer module 110 again triggers a dry run with the new set of downloaded pages.

The scraping engine 114 generates the download script for assets. The navigation rules made up of predicted URL patterns details and navigation limit configuration parameters for web asset as well as web artifact pages are used to generate a cyber-scraper download script by the scraping engine 114.

```
//////////////////// Begin Download Script File ////////////////////
# fetch is the command used by asset web downloader, the command uses
# the asset's url as the input parameter. The script will have all assets
that the #system requires to be updated/downloaded
fetch http://somehost/path/to/asset/assetname1.extension
fetch http://somehost/path/to/asset/assetname2.extension
fetch http://somehost/path/to/asset/assetname3.extension
fetch http://somehost/path/to/asset/assetname4.extension
fetch http://somehost/path/to/asset/assetname5.extension
.....
....
fetch http://somehost/path/to/asset/assetname(n-1).extension
fetch http://somehost/path/to/asset/assetname(n).extension
//////////////////// End of Download Script File ////////////////////
```

The valid URL patterns got from the navigation rule along with the navigation limit parameters are used by the URL generation functions to fill or generate new path segments. The new path segments along with the scraping engine 114 dynamic variable like the current web artifact page number, or current asset number are used to precise asset or artifact download URLs. The downloaded URLs are saved as a base download script. Base download script is a download script that includes all the assets that were previous downloaded and are present in the local repository 102 as well as the newly discovered assets. This data is used to determine if web asset has been downloaded and also improves the overall efficiency of page traversal next time the operation is done for a similar asset.

At step 218, missing assets may be found and downloaded to the local repository 102. There may be situations where the user has added some assets in the cloud. In these situations, only those assets are downloaded to the local repository 102 which are missing in the local repository 102, i.e. difference of the assets in the cloud and the number of assets in the local repository 102.

At step 220, see if more URLs are there in the asset pipeline. If yes, go to step 214. If NO, the method ends.

At step 214, if answer is NO, go to step 222 where it is determined whether the URL correspond to web artifact page. If NO, go to step 220. If yes, go to step 224 where download scripts are generated for downloading the web artifact page or intermediate page. Afterwards, the loop continues.

Figure 3:
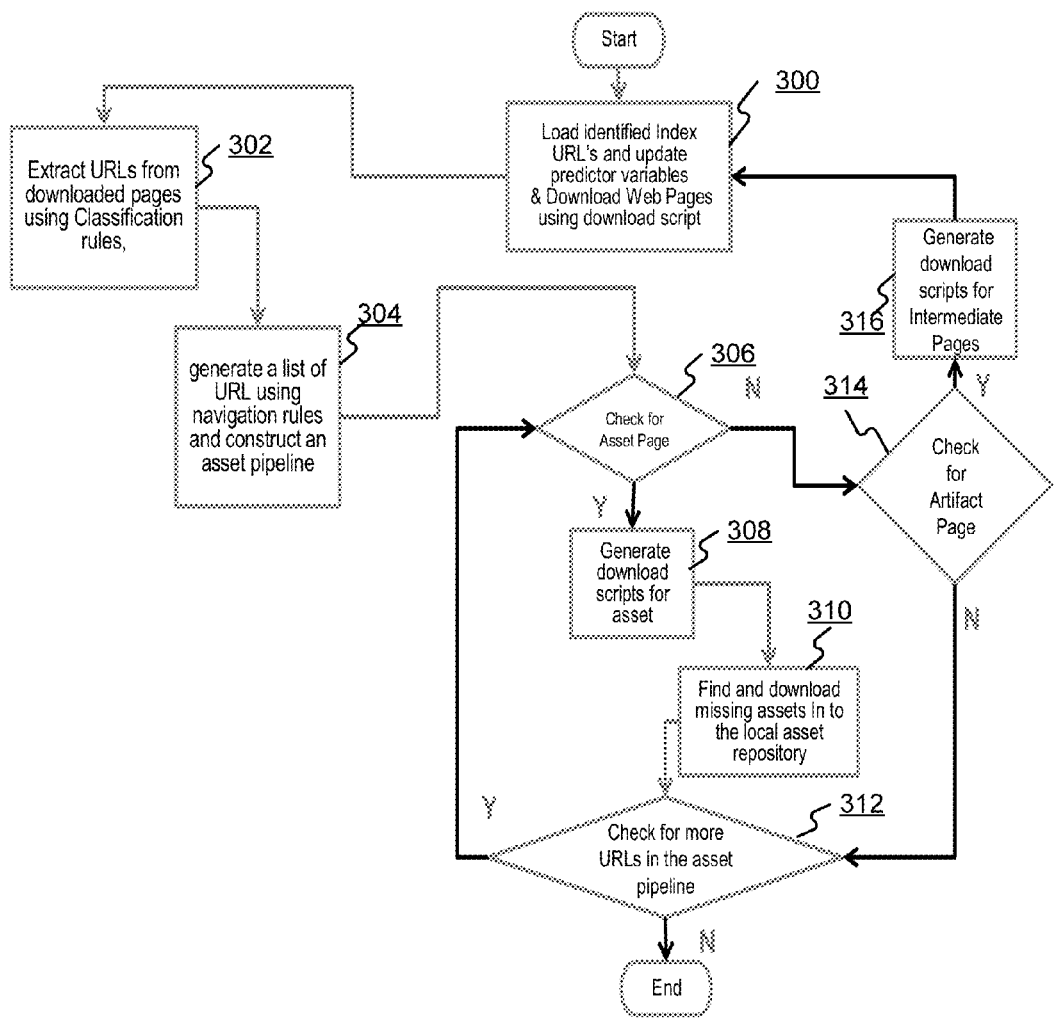
FIG. 3 is a flowchart of an exemplary method for automatic identification and download of the web assets in the cloud based systems during actual run time phase in accordance with certain embodiments of the present disclosure.

FIG. 3 is a flowchart of an exemplary method for automatic identification and download of the web assets in the cloud based systems during actual run time phase in accordance with certain embodiments of the present disclosure.

At step 300, the predictor variable may change. For example, the web asset has moved from one machine to another machine leading to re referencing of the machine. Suppose, the index URL for the previous machine was yahoo.com and now after re referencing, the index URL for the new machine is yahoo.co.in. So this change in the index URL/predictor variable is updated. As a result of this, the asset can be identified and downloaded even if it has moved from one machine to another in the cloud. The machine may include but not limited to a web server. The predetermined URLs are modified as result of the migration of the web asset from one machine to the another machine. After seeding/loading the modified predetermined URLs, corresponding one or more web pages along with associated web links are downloaded using one or more download scripts.

At step 302, all URLs and associated web links from the downloaded one or more web pages are extracted using classification rules. The one or more classification rules satisfy one or more criteria decided by a user. The one or more criteria are associated with retrieving one or more web assets Further, the one or more criteria decided by the user may comprise but not limited to one or more URLs web patterns.

At step 304, a list of URLs is generated using the navigation rules and an asset pipeline of the URLs is constructed.

At step 306, decide whether a URL corresponds to the web asset page. If answer is yes, go to step 308 where download scripts may be generated for downloading the asset.

At step 310, missing assets may be found and downloaded to the local repository 102. There may be situations where the user has added some assets in the cloud. In these situations, only those assets are downloaded to the local repository 102 which are missing in the local repository 102, i.e. difference of the assets in the cloud and the number of assets in the local repository 102.

At step 312, see if more URLs are there in the asset pipeline. If yes, go to step 306. If NO, the method ends.

At step 306, if answer is NO, go to step 314 where it is determined whether the URL correspond to web artifact page. If NO, go to step 312. If yes, generate downloading scripts for downloading the web artifact page or intermediate page (step 316). Afterwards, the loop continues.

Exemplary Computer System

FIG. 4 is a block diagram of an exemplary computer apparatus or system 401 for implementing embodiments consistent with the present disclosure, such as a web asset management computing device 401 by way of example only. Variations of computer system 401 may be used for implementing any of the devices and/or device components presented in this disclosure, including system 100. Computer system 401 may comprise a central processing unit (CPU or processor) 402. Processor 402 may comprise at least one data processor for executing program components for executing user- or system-generated requests. A user may include a person using a device such as such as those included in this disclosure or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 501 may communicate with devices 409. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Object Store, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automating identification and download of one or more web assets residing in a cloud based infrastructure, the method comprising:

seeding, by a web asset management computing device, one or more predetermined URLs to a cyber scraper to download corresponding one or more web pages;

validating, by the web asset management computing device, one or more first URLs from the downloaded one or more web pages based at least in part on one or more classification rules, the one or more classification rules satisfying one or more criteria associated with retrieving the one or more web assets;

parsing, by the web asset management computing device, each of the validated one or more first URLs into one or more predictor values derived from one or more predictor variables, the one or more predictor values comprise features extracted from the one or more web pages and web links associated with the one or more web pages;

generating, by the web asset management computing device, one or more navigation rules by performing logistic regression on the predictor values, wherein the performing logistic regression on the predictor values comprises using a polynomial function comprising of the one or more predictor values and coefficients pertaining to the features extracted from the one or more web pages and web links associated with the one or more web pages;

constructing a web asset pipeline comprising one or more second URLs using generated one or more navigation rules;

training, by the web asset management computing device, the cyber scraper to identify and download the one or more web assets or an intermediate web artifact page for each of the one or more second URLs; and identifying and downloading, by the web asset management computing device, the one or more web assets or the intermediate web artifact page during run time for each of the one or more second URLs generated using the one more navigation rules.

2. The method of claim 1, wherein the identifying and downloading one or more web assets or the intermediate web artifact page during run time further comprises:

modifying, by the web asset management computing device, one or more predetermined URLs by updating the one or more predictor variables;

loading, by the web asset management computing device, the modified one or more predetermined URLs to download corresponding one or more web pages;

validating, by the web asset management computing device, one or more third URLs from the downloaded one or more web pages based at least in part on one or more classification rules associated with retrieving the one or more web assets satisfying the one or more criteria decided by the user;

generating, by the web asset management computing device, one or more fourth URLs of the one or more third URLs based at least in part on the one or more navigation rules.

3. The method of claim 1, wherein the one or more criteria decided by the user comprises one or more URLs web patterns.

4. The method of claim 3, wherein the one or more web patterns comprise naming construction, numeric construction, alphabetic construction, depth of url, host name, ids, and string construction of the one or more first URLs.

5. The method of claim 1, wherein the features are updated with coefficients derived from historical and training data in a data store, the coefficients and polynomial order of the features are adjusted by the user to improve the efficiency of prediction and operation of the cyber scraper.

6. The method of claim 1, further comprising determining, by the web asset management computing device, a difference between one or more first web assets in a local repository and the one or more second web assets residing in the cloud.

7. The method of claim 6, further comprising downloading, by the web asset management computing device, a script for downloading only web assets corresponding to difference between the one or more first web assets in the local repository and the missing or updated one or more second web assets residing in the cloud.

8. A computing apparatus comprising:
one or more hardware processors; and
a computer-readable medium storing instructions that, when executed by the one or more hardware processors, cause the one or more hardware processors to perform operations comprising:
seeding one or more predetermined URLs to a cyber scraper to download corresponding one or more web pages;
validating one or more first URLs from the downloaded one or more web pages based at least in part on one or more classification rules, the one or more classification rules satisfying one or more criteria associated with retrieving the one or more web assets;
parsing each of the validated one or more first URLs into one or more predictor values derived from one or more predictor variables, the one or more predictor values comprise features extracted from the one or more web pages and web links associated with the one or more web pages;
generating one or more navigation rules by performing logistic regression on the predictor values, wherein the performing logistic regression on the predictor values comprises using a polynomial function comprising of the one or more predictor values and coefficients pertaining to the features extracted from the one or more web pages and web links associated with the one or more web pages;
constructing a web asset pipeline comprising one or more second URLs using generated one or more navigation rules;
training the cyber scraper to identify and download the one or more web assets or an intermediate web artifact page for each of the one or more second URLs; and
identifying and downloading the one or more web assets or the intermediate web artifact page during run time for each of the one or more second URLs generated using the one more navigation rules.

9. The apparatus of claim 8, wherein the identifying and downloading the web asset page or the intermediate web artifact page during run time comprises:
modifying one or more predetermined URLs by updating the one or more predictor variables;
loading the modified one or more predetermined URLs to download corresponding one or more web pages;
validating one or more third URLs from the downloaded one or more web pages based at least in part on one or more classification rules associated with retrieving the one or more web assets satisfying the one or more criteria decided by the user;
generating one or more fourth URLs of the one or more third URLs based at least in part on the one or more navigation rules.

10. The apparatus of claim 8, wherein the one or more criteria decided by the user comprises one or more URLs web patterns and one or more web asset patterns.

11. The apparatus of claim 10, wherein the one or more web patterns comprise naming construction, numeric construction, alphabetic construction, depth of url, host name, ids, and string construction of the one or more first URLs.

12. The apparatus of claim 8, wherein the features are updated with coefficients derived from historical and training data in a data store wherein the coefficients and polynomial order of the features are adjusted by the user to improve the efficiency of prediction and operation of the cyber scraper.

13. The apparatus of claim 8, wherein the medium stores further instructions that, when executed by the one or more hardware processors, cause the one or more hardware processors to perform operations comprising determining a difference between one or more first web assets in a local repository and the one or more second web assets residing in the cloud.

14. The apparatus of claim 13, wherein the medium stores further instructions that, when executed by the one or more hardware processors, cause the one or more hardware processors to perform operations comprising downloading a script for downloading only web assets corresponding to difference between the one or more first web assets in the local repository and the missing or updated one or more second assets residing in the cloud.

15. A non-transitory computer-readable medium storing instructions for automating identification and download of one or more web assets residing in a cloud based infrastructure that, when executed by the one or more hardware processors, cause the one or more hardware processors to perform operations comprising:
seeding, by a web asset management computing device, one or more predetermined URLs to a cyber scraper to download corresponding one or more web pages;
validating, by the web asset management computing device, one or more first URLs from the downloaded one or more web pages based at least in part on one or more classification rules, the one or more classification rules satisfying one or more criteria associated with retrieving the one or more web assets;
parsing, by the web asset management computing device, each of the validated one or more first URLs into one or more predictor values derived from one or more predictor variables, the one or more predictor values comprise features extracted from the one or more web pages and web links associated with the one or more web pages;
generating, by the web asset management computing device, one or more navigation rules by performing logistic regression on the predictor values, wherein the performing logistic regression on the predictor values comprises using a polynomial function comprising of the one or more predictor values and coefficients pertaining to the features extracted from the one or more web pages and web links associated with the one or more web pages;
constructing a web asset pipeline comprising one or more second URLs using generated one or more navigation rules;
training, by the web asset management computing device, the cyber scraper to identify and download the one or more web assets or an intermediate web artifact page for each of the one or more second URLs; and
identifying and downloading, by the web asset management computing device, the one or more web assets or the intermediate web artifact page during run time for each of the one or more second URLs generated using the one more navigation rules.

16. The non-transitory computer-readable medium of claim 15, wherein the identifying and downloading the web asset page or the intermediate web artifact page during run time further comprises:
- modifying one or more predetermined URLs by updating the one or more predictor variables;
- loading the modified one or more predetermined URLs to download corresponding one or more web pages;
- validating one or more third URLs from the downloaded one or more web pages based at least in part on one or more classification rules associated with retrieving the one or more web assets satisfying the one or more criteria decided by the user;
- generating one or more fourth URLs of the one or more third URLs based at least in part on the one or more navigation rules.

* * * * *